(12) United States Patent
Agrawal et al.

(10) Patent No.: US 12,491,791 B2
(45) Date of Patent: Dec. 9, 2025

(54) INTERNET OF THINGS BASED SYSTEM AND METHOD TO MANAGE SWAPPING OF BATTERY IN AN ELECTRIC TWO-WHEELER

(71) Applicant: Oben Electric Vehicles Private Limited, Bangalore (IN)

(72) Inventors: Dinkar Agrawal, Bangalore (IN); Madhumita Agrawal, Bangalore (IN); Aditya Ganjapure, Nagpur (IN); Sagar Thakkar, Ahmedabad (IN)

(73) Assignee: Oben Electric Vehicles Private Limited (IN)

( * ) Notice: Subject to any disclaimer, the term of this patent is extended or adjusted under 35 U.S.C. 154(b) by 185 days.

(21) Appl. No.: 18/686,487

(22) PCT Filed: Sep. 19, 2022

(86) PCT No.: PCT/IB2022/058818
§ 371 (c)(1),
(2) Date: Feb. 26, 2024

(87) PCT Pub. No.: WO2023/026265
PCT Pub. Date: Mar. 2, 2023

(65) Prior Publication Data
US 2025/0121732 A1    Apr. 17, 2025

(30) Foreign Application Priority Data
Aug. 26, 2021   (IN) .............................. 202141038639

(51) Int. Cl.
*B60L 53/80* (2019.01)
*B60L 53/65* (2019.01)
(Continued)

(52) U.S. Cl.
CPC ............... *B60L 53/80* (2019.02); *B60L 53/65* (2019.02); *B60L 58/12* (2019.02); *B60L 58/16* (2019.02);
(Continued)

(58) Field of Classification Search
CPC .......... B60L 53/80; B60L 53/65; B60L 58/12; B60L 58/16; B60L 2200/12;
(Continued)

(56) References Cited

U.S. PATENT DOCUMENTS

| | | | |
|---|---|---|---|
| 8,798,852 B1 * | 8/2014 | Chen ..................... | G06F 21/44 701/32.7 |
| 2019/0202416 A1 * | 7/2019 | Lai .......................... | B60L 53/80 |
| 2020/0313249 A1 * | 10/2020 | Zhao ................ | H01M 10/4257 |

FOREIGN PATENT DOCUMENTS

| | | | |
|---|---|---|---|
| CN | 109747466 | * | 5/2019 |
| EP | 3505387 | * | 7/2019 |

* cited by examiner

*Primary Examiner* — Muhammad Shafi
(74) *Attorney, Agent, or Firm* — Jason C. Cameron (57) ABSTRACT

An INTERNET OF THINGS based computing system (100) to manage swapping of a battery in an electric two-wheeler is disclosed. The plurality of subsystems includes a battery health data capturing subsystem (112), configured to capture battery health data of the battery through sensors. The plurality of subsystems includes a battery swapping subsystem (116), configured to compare the captured battery health data with a threshold battery health data and determine whether battery swapping is necessary based on the compared result. The battery swapping subsystem (116) is configured to identify a proximal battery swapping station based on the compared results and also assign a battery swapping technician. The battery swapping subsystem (116) is configured to authenticate the assigned battery swapping tech- (Continued)

nician to lock and unlock battery storage bay using secure keys for swapping of a discharged battery.

20 Claims, 4 Drawing Sheets (51) Int. Cl.
*B60L 58/12* (2019.01)
*B60L 58/16* (2019.01)
*B62J 45/20* (2020.01)
*G06Q 10/0631* (2023.01)
*G06Q 10/20* (2023.01)
*G07C 5/00* (2006.01)
*H01M 50/249* (2021.01)
*G07C 5/02* (2006.01)
*G07C 5/10* (2006.01)
*G16Y 20/30* (2020.01)

(52) U.S. Cl.
CPC ........ *B62J 45/20* (2020.02); *G06Q 10/06311* (2013.01); *G06Q 10/20* (2013.01); *G07C 5/008* (2013.01); *H01M 50/249* (2021.01); *B60L 2200/12* (2013.01); *B60L 2240/545* (2013.01); *B60L 2240/547* (2013.01); *B60L 2240/549* (2013.01); *B60L 2240/72* (2013.01); *G07C 5/02* (2013.01); *G07C 5/10* (2013.01); *G16Y 20/30* (2020.01); *H01M 2220/20* (2013.01)

(58) Field of Classification Search
CPC ......... B60L 2240/545; B60L 2240/547; B60L 2240/549; B60L 2240/72; B60L 53/68; B60L 2240/62; B60L 2250/18; B60L 2250/20; B62J 45/20; G06Q 10/06311; G06Q 10/20; G06Q 50/40; G06Q 10/08; G06Q 50/06; G07C 5/008; G07C 5/02; G07C 5/10; H01M 50/249; H01M 2220/20; G16Y 20/30; G16Y 10/40; Y02T 10/70
USPC ........................................................ 701/29.2
See application file for complete search history.

INTERNET OF THINGS BASED SYSTEM AND METHOD TO MANAGE SWAPPING OF BATTERY IN AN ELECTRIC TWO-WHEELER

This Application claims priority from a Provisional patent application filed in India having patent application Ser. No. 20/214,1038639, filed on Aug. 26, 2021, and titled "IoT BASED SYSTEM AND METHOD TO MANAGE SWAPPING OF BATTERY IN AN ELECTRIC TWO-WHEELER" and a PCT patent application bearing Application No. PCT/IB2022/058818, filed on 19 Sep. 2022, and titled "INTERNET OF THINGS BASED SYSTEM AND METHOD TO MANAGE SWAPPING OF BATTERY IN AN ELECTRIC TWO-WHEELER".

FIELD OF INVENTION

Embodiments of the present disclosure relates to battery swapping mechanisms in an electric two-wheeler, and more particularly relates to an IoT based system and a method to manage swapping of a battery of an electric two-wheeler.

BACKGROUND

Currently, automobiles with electric drivetrain are thriving worldwide due to drivetrain eco-friendly nature. An electric motor is powered by electric charge stored in rechargeable batteries. However, once the rechargeable batteries are discharged, the rechargeable batteries need to be charged again.

In one conventional situation, the rechargeable batteries may be charged through dedicated charging whereby a user can charge the electric two-wheeler at a charging station or at home with an electric two-wheeler (EV) charger. However, locating the charging stations nearby is a challenging task for the user which often causes range anxiety. Often, the users worry on how far the electric two-wheeler can travel before the electric two-wheeler finally stops.

The user has constant fear of absence of the charging station nearby where the rechargeable battery of the electric two-wheeler can be charged. Once the user locates the charging station, the electric two-wheeler is taken to the charging station to recharge the discharged rechargeable battery. Further, charging of the rechargeable battery takes a long duration ranging from 1.5 hours to 8.5 hours adding to the discomfort of the user. It is not feasible on the user's part to spare such long hours just for recharging the rechargeable battery of the electric two-wheeler. Effective mechanism would be to know beforehand that when charge is required and when not required, so the user can plan accordingly.

Hence, there is a need for an improved IoT based system to manage swapping of battery of the electric two-wheeler and a method to operate the same and therefore address the aforementioned issues.

BRIEF DESCRIPTION

In accordance with one embodiment of the disclosure, an IoT based system to manage swapping of a battery in an electric two-wheeler is disclosed. The system includes a hardware processor. The system also includes a memory coupled to the hardware processor. The memory comprises a set of program instructions in the form of a plurality of subsystems and configured to be executed by the hardware processor.

The plurality of subsystems includes a battery health data capturing subsystem. The battery health data capturing subsystem is configured to capture battery health data of the battery through one or more sensors. The battery health data comprises State of Charge (SoC) parameter and State of Health (SoH) parameter of the battery.

The plurality of subsystems also includes a vehicular metrics monitoring subsystem. The vehicular metrics monitoring subsystem is configured to monitor one or more electric two-wheeler parameters associated with the electric two-wheeler based on the captured battery health data. The one or more electric two-wheeler parameters comprises braking, acceleration, speed, economy, torque and top speed.

The plurality of subsystems also includes a battery swapping subsystem. The battery swapping subsystem is configured to compare the captured each of the battery health data with a prestored corresponding threshold battery health data. The battery swapping subsystem is configured to determine whether battery swapping is necessary based on the compared result. The battery swapping subsystem is configured to identify a proximal battery swapping station based on the compared results and a current real time location of the electric two-wheeler and shares the current real time location to a smart device associated with the battery swapping person. The battery swapping subsystem is configured to assign a battery swapping technician based on the identified battery swapping station, location, parking status and location of the electric two-wheeler, specific request for swapping raised by the user, and availability of battery swapping person. The battery swapping subsystem is configured to authenticate the assigned battery swapping technician to lock and unlock a battery storage bay using secure keys for swapping of a discharged battery.

In accordance with one embodiment of the disclosure, a method to manage swapping of a battery in an electric two-wheeler is disclosed. The method includes capturing battery health data of the battery through one or more sensors. The method also includes monitoring one or more electric two-wheeler associated with the electric two-wheeler based on the captured battery health data.

The method also includes comparing the captured battery health data with a threshold battery health data. The method also includes determining whether battery swapping is necessary based on the compared result. The method also includes identifying a proximal battery swapping station based on the compared results and a current real time location of the electric two-wheeler and shares the current real time location to a smart device associated with the battery swapping person. The method also includes assigning a battery swapping technician based on the determined battery swapping station, location, parking status and location of the electric two-wheeler, specific request for swapping raised by the user, and availability of battery swapping person. The method also includes authenticating the assigned battery swapping technician to lock and unlock a battery storage bay using secure keys for swapping of a discharged battery.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

Figure 1:
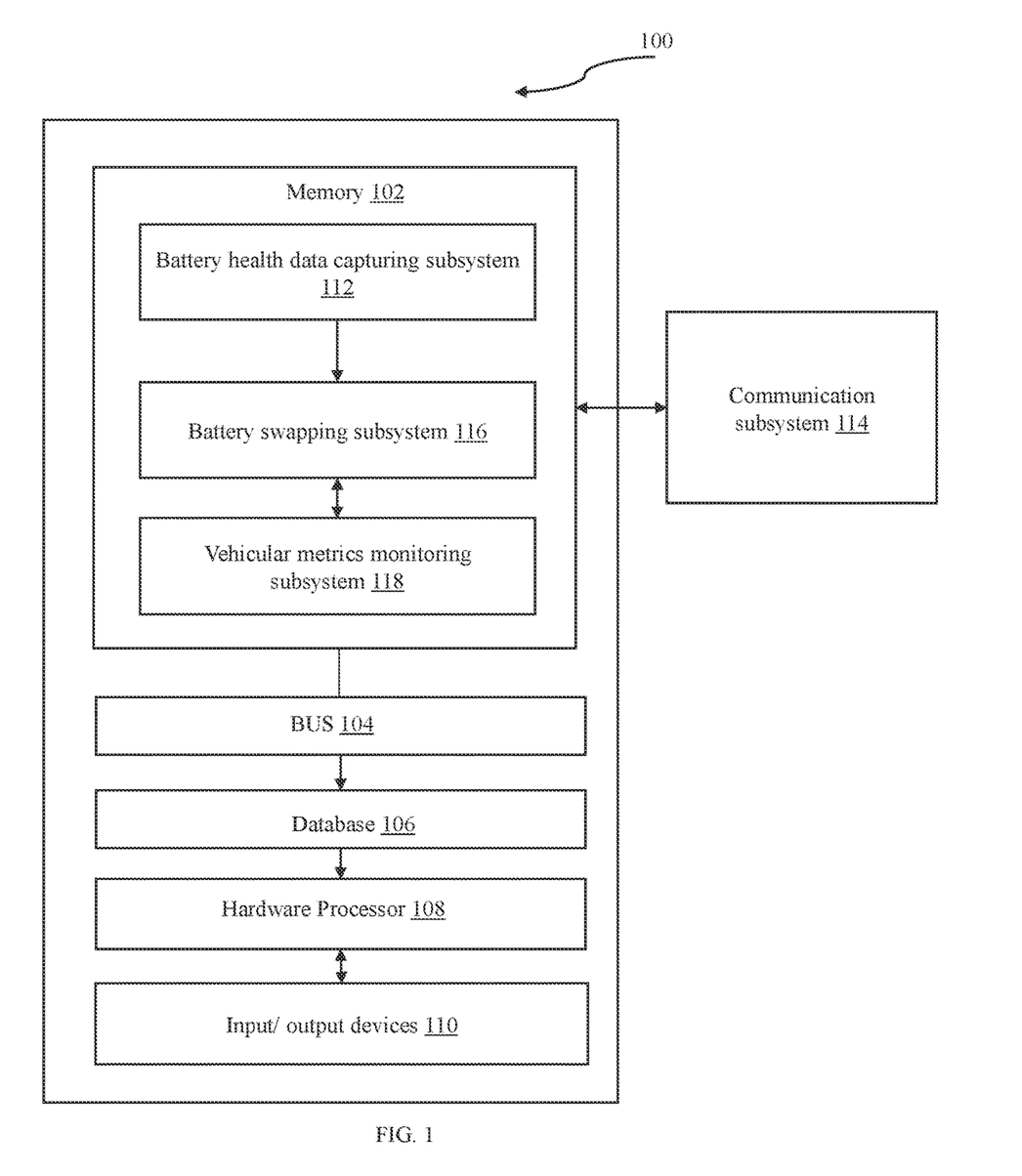
FIG. 1 is a block diagram illustrating an exemplary IoT based computing system to manage swapping of a battery in an electric two-wheeler in accordance with an embodiment of the present disclosure.

FIG. 1 is a block diagram illustrating an exemplary an IoT based computing system 100 to manage swapping of a battery in an electric two-wheeler in accordance with an embodiment of the present disclosure. Battery swapping is a technique that consists of swapping a discharged electric two-wheeler battery with one that is already charged. In such embodiment, long recharging time duration of the batteries are eliminated, which is one of the major limitations of zero-emission electric two-wheelers. The IoT based computing system 100 automates the whole battery swapping process and maintains a profile for the electric two-wheeler rider. As used herein, the term "Internet of things (IoT)" describes physical objects that are embedded with sensors, processing ability, software, and other technologies that connect and exchange data with other devices and systems over the Internet or other communications networks.

The IoT based computing system 100 includes a hardware processor 108. The IoT based computing system 100 also includes a memory 102 coupled to the hardware processor 108. The memory 102 comprises a set of program instructions in the form of a plurality of subsystems and configured to be executed by the hardware processor 108.

The hardware processor(s) 108, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof. Input/output (I/O) devices 110 (including but not limited to keyboards, displays, pointing devices, etc.) may be coupled to the system either directly or through intervening I/O controllers The memory 102 includes a plurality of subsystems stored in the form of executable program which instructs the hardware processor 108 via bus 104 to perform the method steps. The memory 102 has following plurality of subsystems: a battery health data capturing subsystem 112, a vehicular metrics monitoring subsystem 118 and a battery swapping subsystem 116.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor(s) 108.

The plurality of subsystems includes the battery health data capturing subsystem 112. The battery health data capturing subsystem 112 is configured to capture battery health data of the battery through one or more sensors. The battery health data includes State of Charge (SoC) parameter and State of Health (SoH) parameter of the battery. The one or more sensors may include a temperature sensor, a voltage sensor and the like. As used herein, the "State of Health" is defined as the ratio of the maximum battery capacity after full charge to battery rated capacity.

The plurality of subsystems further includes a geographical location tracking subsystem which helps in tracking current or live geolocation of the electric two-wheeler through a location detection mechanism, such as Global Positioning System (GPS) system. In one embodiment, the geographical location tracking subsystem may include connection with BeiDou/BDS, Galileo, GLONASS, IRNSS/NavIC, and QZSS for positioning, navigation, and timing services. In another embodiment, the battery is configured to have the geographical location tracking subsystem. The Global Positioning System (GPS) system helps to track the location of the battery of the electric two-wheeler in real time.

Installation of a separate Global Positioning System (GPS) system on the battery helps in tracking the geographical location of the battery of the electric two-wheeler. The electric two-wheeler is also embedded with artificial intelligence systems like geo-fencing, geo-tagging, and the like. The Geo-fencing system is to create a virtual boundary across any territory with the help of GPS, Radio Frequency Identification (RFID), Wireless Fidelity (Wi-Fi), and the like.

Therefore, whenever the electric two-wheeler gets stolen by an unauthorized person or the electric two-wheeler is driven beyond the predefined territorial boundary, the virtual geo-fence triggers an alert and communicates the same to the battery swapping subsystem 116. This tracking is helpful in operating the electric two-wheeler within a predefined territorial boundary, thereby preventing the electric two-wheeler from getting stranded in an area which does not have the battery charging stations. The tracking feature may also be used to avert instances of theft and unauthorised use of the electric two-wheeler.

The IoT based computing system 100 ensures efficient functioning of the battery and prevents the battery from exceeding safe limits of operation by monitoring individual cells of the battery. The temperature sensor and the voltage or the current sensor is configured to monitor the State of Charge (SoC) parameter of the battery and voltage or current flow. The State of Charge (SoC) parameter is an indicator of the amount of charge still left to be used in the battery. For example, when the battery State of Charge (SoC) parameter is 100%, the parameter value indicates that the battery is in a fully charged state. Similarly, when the battery State of Charge (SoC) parameter is less than a predefined threshold value, the parameter value indicates that the battery is discharged and/or swapping action may be initiated. A predefined threshold of State of Charge (SoC) value is stored in database 106 of the IoT based computing system 100.

The plurality of subsystems also includes the vehicular metrics monitoring subsystem 118. The vehicular metrics monitoring subsystem 118 is configured to monitor one or more electric two-wheeler parameters through one or more electric two-wheeler sensors. The one or more electric two-wheeler parameters includes braking, acceleration, speed, economy, torque, top speed and the like. In such embodiment, the one or more electric two-wheeler sensors includes Inertial Measurement Unit (IMU) sensor, Revolutions Per Minute (RPM) sensor, Current measurement sensor and the like. The plurality of subsystems also includes an electric two-wheeler profile subsystem. The electric two-wheeler profile subsystem is configured to create a rider profile based on the monitored one or more electric two-wheeler parameters and one or more electric two-wheeler usage parameters. The one or more electric two-wheeler usage parameters includes average distance travelled per day, driving style, days of week when used, job profile, parameters representative of driving capability and style, parking locations and durations, availability of battery charging stations in vicinity and areas frequently travelled.

In an embodiment, the predefined threshold value of State of Charge (SoC) may be customised to each rider based on a rider's profile. The State of Charge (SoC) is customized in accordance with rider driving style. The driving style may include rough handling of electric two-wheeler such as sudden accelerations and breaks, and long and continuous riding.

In another embodiment, the predefined threshold value of State of Charge (SoC) may be dynamically customised based on the changes in the rider's profile. The customisation of predefined threshold value of State of Charge (SoC) is technically very useful in averting the rider from getting stranded due to the discharged battery. For example, in cases where the rider's profile indicates a rough driving style, then the predefined threshold value of State of Charge (SoC) is increased so that the rider and the IoT based computing system 100 may alerted with enough charge in battery to manage the battery swapping or enable the rider to reach the battery charging station.

Threshold changes automatically based upon riding patterns. For example, if a Rider A always uses 100% charge to only drive 50 kms and Rider B always used 100% charge for 100 Kms. Then the threshold may be selected keeping in mind the distance of nearest battery swap station available in order to avoid vehicle downtime on road.

The plurality of subsystems also includes the battery swapping subsystem 116. The battery swapping subsystem 116 is configured to compare the captured battery health data with prestored corresponding threshold battery health data. The prestored corresponding threshold battery health data is stored in the database 106. For example, in real time, a prestored corresponding threshold battery health data is being provided. The IoT based computing system 100 compares the captured each of the battery health data with the prestored corresponding threshold battery health data and analyses whether battery swapping is needed or not. Therefore, the battery swapping subsystem 116 determines whether battery swapping is necessary based on the compared result. In one embodiment, the IoT based computing system 100 determines if the captured each of the battery health data is below the corresponding threshold battery health data. In such embodiment, the IoT based computing system 100 determines whether the battery swapping is required based on the determined result.

The battery swapping subsystem 116 is configured to identify a proximal battery swapping station based on the compared results and a current real time location of the electric two-wheeler and shares the current real time location to a smart device associated with the battery swapping person. In such embodiment, if the IoT based computing system 100 determines if there is a necessity of battery swapping, then in accordance to tracked geolocation of the electric two-wheeler a battery swapping station is identified. The location of registered battery swapping station is stored in the database 106 beforehand. The smart device may include a mobile phone, a smart phone, a wearable device, a computer, a tablet or the like.

The battery swapping subsystem 116 is also configured to assign a battery swapping technician based on the identified battery swapping station, location, parking status and location of the electric two-wheeler, specific request for swapping raised by the user, and availability of battery swapping person. As used herein, the term "battery swapping technician" refers to a battery swapping expert. The battery swapping subsystem is also configured to authenticate the assigned battery swapping technician to lock and unlock a battery storage bay using secure keys for swapping of a discharged battery.

In an embodiment, each battery is configured to have its own unique identification (ID). The unique identification (ID) helps to keep a track of usage of the battery with respect to the electric two-wheeler and riders of the electric two-wheeler. Further, with help of the unique identification (ID), the IoT based computing system 100 tracks and maintains historical data for each battery. The historical data may include when the battery had started working, in which electric two-wheeler battery was used and for what duration the battery had been used in the electric two-wheeler, how many times the battery has been charged, frequency of charging of the battery, and the like.

In one embodiment, an Electric two-wheeler Control Unit (VCU) is configured in the electric two-wheeler, and the Electric two-wheeler Control Unit (VCU) is in communication with the battery health data capturing subsystem 112 and the geographical location tracking subsystem. The Electric two-wheeler Control Unit (VCU) is responsible to control torque coordination, charging control, and the like.

The IoT based computing subsystem 100 also includes a communication subsystem 114. The communication subsystem 114 includes, but not limited to, General Packet Radio Service (GPRS) module, third generation (3G) module, fourth generation long-term evolution (4G LTE), and the like. The communication subsystem 120 is configured to receive the battery State of Charge (SoC) from the battery health data capturing subsystem 112, respectively and transmit the battery State of Charge (SoC) to the battery swapping subsystem 116 over a communication network. The communication subsystem 114 is configured enable exchange of data between the communication subsystem 114 of the electric two-wheeler and the battery swapping subsystem 116 using one of internet communication protocols and IoT protocols including Bluetooth Low Energy (BLE), Zigbee, Message Queuing Telemetry Transport (MQTT), and the like.

In one exemplary embodiment, the battery swapping subsystem 116 is configured to assign a battery swapping technician and monitor other activities. Upon receiving an alert that the battery State of Charge (SoC) reaching the predefined threshold value of State of Charge (SoC), the battery swapping subsystem 116 assigns a battery swapping technician based on a plurality of parameters for swapping the discharged battery with the charged battery with or without the user's intervention. The parameters may include geographical location of the electric two-wheeler, nearest location of a battery charging station detected with respect to the geographical location of the electric two-wheeler, parking status and location of the electric two-wheeler, specific request for swapping raised by the user, and availability of battery swapping technician.

An electronic lock, installed in the electric two-wheeler, is configured to unlock the electric two-wheeler based on one of two way or one way authentication. In an embodiment, the electronic lock module may use Bluetooth® technology, and the like for pairing and unlocking, where the battery swapping subsystem 116 communicates the Bluetooth® pairing key specific for the electric two-wheeler. In another embodiment, a security pin pops up on screen of the smart device associated with the battery swapping person when the battery swapping person is around or near the electric two-wheeler.

Upon entering the correct security pin, the battery swapping technician may unlock the electric two-wheeler and get access to a battery bay of the electric two-wheeler even in the absence of the user of the electric two-wheeler. Thus, the battery swapping technician may swap the discharged battery of the electric two-wheeler with the charged battery. In an embodiment, the battery bay may be positioned under the seat, under the footrest, at the front section below neck stem or at either side of a rear section of the electric two-wheeler.

Figure 2:
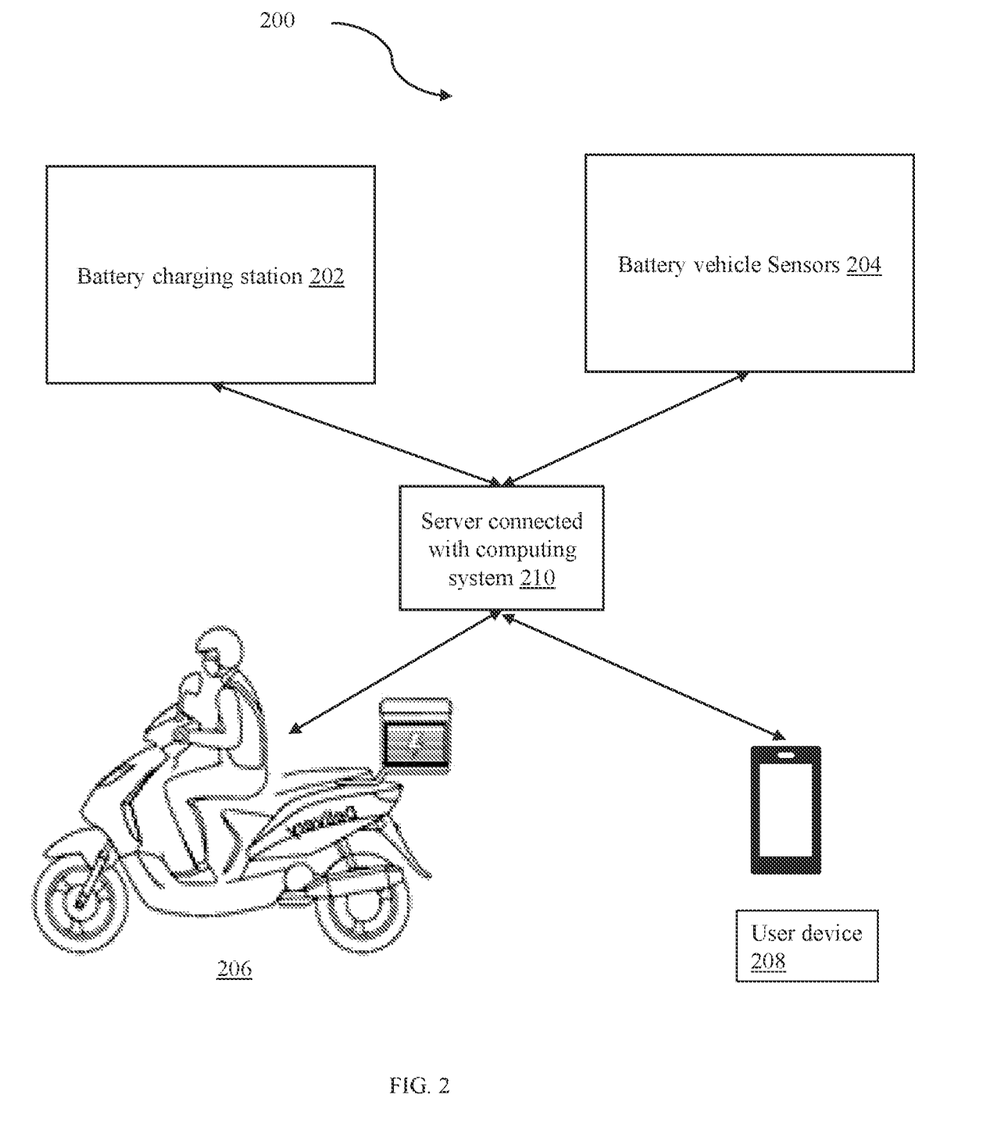
FIG. 2 is a schematic representation illustrating an environment of the working of the computing system in an electric two-wheeler in accordance with an embodiment of the present disclosure.

FIG. 2 is a schematic representation illustrating an environment 200 of the working of the computing system in an electric two-wheeler in accordance with an embodiment of the present disclosure. The environment 200 includes battery charging station 202, electric vehicle sensors 204 associated with the electric two-wheeler, a user device 208 of the assigned battery swapping technician and the process 206 of picking up the electric two-wheeler after battery swap completion. The whole process is regulated via a server 210 comprising the plurality of subsystems.

Figure 3:
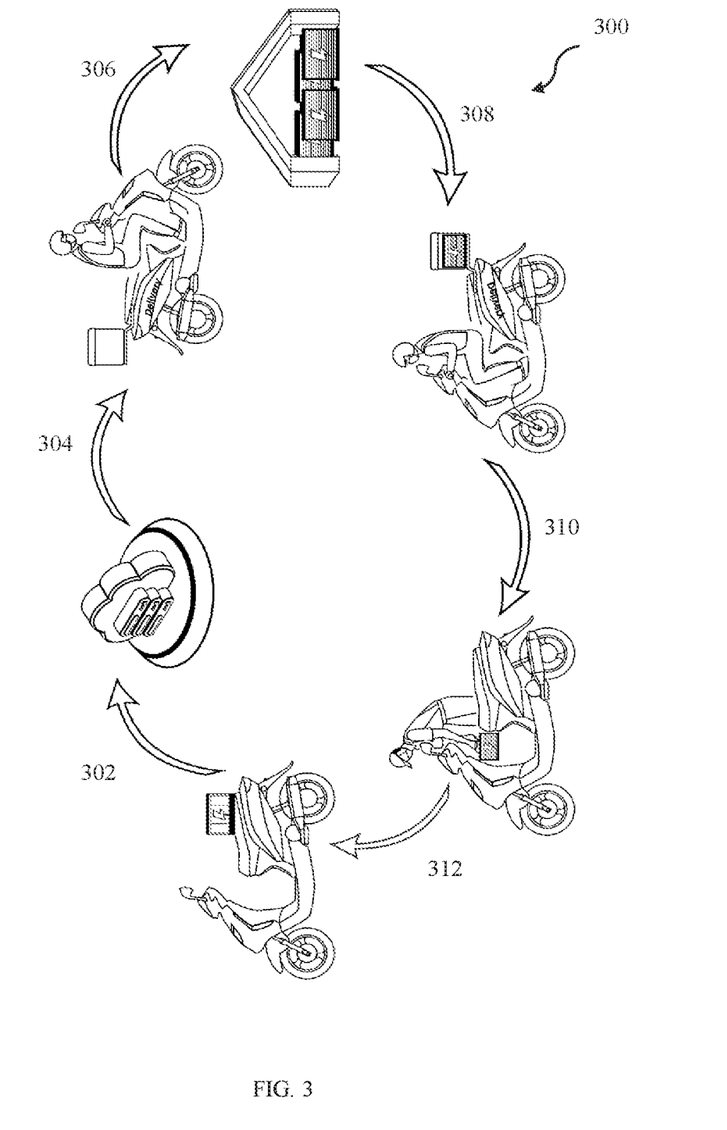
FIG. 3 illustrates a scenario of battery swapping in accordance with an embodiment of the present invention.

FIG. 3 illustrates a scenario 300 of battery swapping in accordance with an embodiment of the present invention. At step 302, an alert is triggered when the State of Charge (SoC) of the battery goes below the predefined threshold value of State of Charge (SoC). The alert is communicated to the battery swapping subsystem 116. At step 304, upon receiving the alert, the battery swapping subsystem 116 assigns the battery swapping technician based on the parameters such as, but not limited to, nearest battery swapping person available, parking status of the electric two-wheeler and the location of the electric two-wheeler.

In an embodiment, the computing system 100 initiates a battery swapping action only when the electric two-wheeler is parked. In such embodiment, the parking status is determined based on the rider's profile which includes regular parking spots of the rider and duration of parking.

In another embodiment, the computing system 100 tracks the live location of a moving electric two-wheeler, once the State of Charge of the battery goes below the predefined threshold value. The computing system 100 enables the battery swapping technician to intercept the moving electric two-wheeler and complete battery swapping.

At step 306, the battery swapping subsystem 116 identifies the nearest battery charging station with a charged battery and shares coordinates of the same to a smart device associated with the battery swapping technician.

At step 308, the battery swapping technician picks up the charged battery from the identified nearest battery charging station and heads towards the location of the electric two-wheeler.

At step 310, the battery swapping technician, upon reaching the location of the electric two-wheeler, authenticates via the smart device associated with him and unlocks the battery bay by inputting received security keys. The discharged battery is swapped with the charged battery. After swapping, the communication subsystem 114 of the electric two-wheeler sends the unique ID of the charged battery, State of Charge level, and time of installation, and details of battery swapping technician to the battery swapping subsystem 116 for maintaining the historical data associated with the battery. At step 312, the electric two-wheeler is ready for reuse.

The historical data may include when the battery had started working, in which electric two-wheeler the battery was used and for what duration the battery had been used, how many times the battery has been charged, frequency of charging of the battery, and the like. The database 106 is configured to store the captured vehicular metrics, historical data of each of the batteries, and riders' profile. In an embodiment, the database 106 resides in the server. In another embodiment, the database 106 is configured in another server communicatively coupled with the server.

Figure 4:
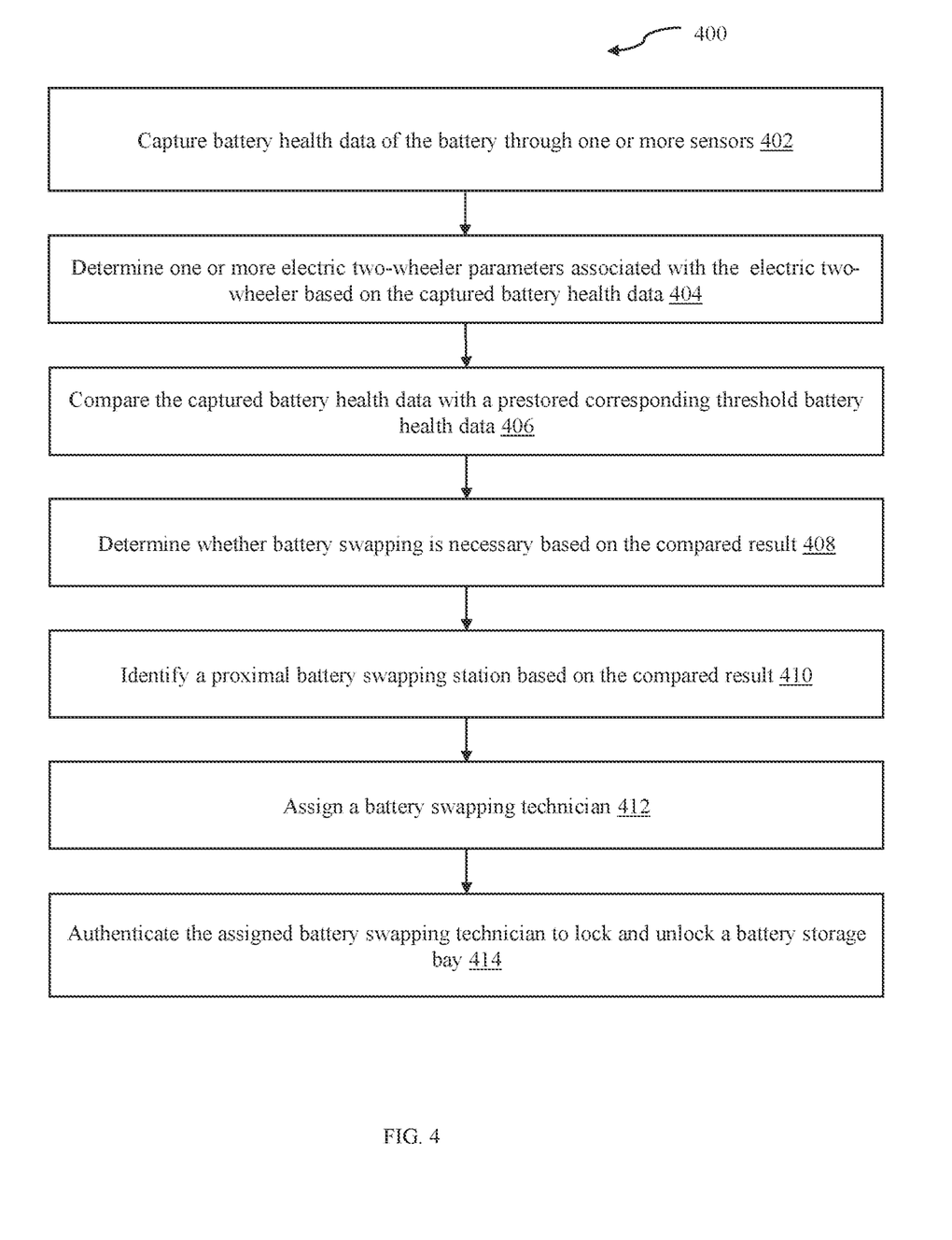
FIG. 4 is a process flowchart illustrating an exemplary method to manage swapping of a battery in an electric two-wheeler in accordance with an embodiment of the present disclosure.

FIG. 4 is a process flowchart illustrating an exemplary method 400 to manage swapping of a battery in an electric two-wheeler in accordance with an embodiment of the present disclosure.

In step 402, battery health data of the battery is captured through one or more sensors. In one aspect of the present embodiment, the battery health data of the battery is captured by battery health data capturing subsystem 112. In such embodiment, the battery health data comprises State of Charge (SoC) parameter and State of Health (SoH) parameter of the battery. In such embodiment, one or more sensors comprises a temperature sensor and a voltage sensor.

The method 400 includes tracking of geolocation of the electric two-wheeler through a Global Positioning System (GPS) sensor. In one aspect of the present embodiment, the geolocation of the electric two-wheeler is tracked by a geographical location tracking subsystem. In such embodiment, tracking of the geolocation of the electric two-wheeler also enable electric two-wheeler riders to avert instances of theft and unauthorised use.

In step 404, one or more electric two-wheeler parameters is monitored through one or more electric two-wheeler sensors. In one aspect of the present embodiment, the one or more electric two-wheeler parameters is monitored by a vehicular metrics monitoring subsystem 118. The one or more electric two-wheeler parameters comprises braking, acceleration, speed, economy, torque and top speed.

In step 406, the captured battery health data is compared with a prestored corresponding threshold battery health data. In one aspect of the present embodiment, the captured battery health data is compared with the prestored corresponding threshold battery health data by a battery swapping subsystem 116. In such embodiment, the prestored corresponding threshold battery health data is dynamically customised based on real time changes in the rider's profile. The prestored corresponding threshold battery health data is modified based on the monitored one or more electric two-wheeler parameters and one or more electric two-wheeler usage parameters.

In step 408, whether battery swapping is necessary is determined based on the compared result. In one aspect of the present embodiment, whether battery swapping is necessary is determined by the battery swapping subsystem 116. In such embodiment, for determining whether the battery swapping is required based on the compared result, the method 400 includes comparing the captured each of the battery health data with a prestored corresponding threshold battery health data. In such exemplary embodiment, the method 400 determines if the captured each of the battery health data is below the corresponding threshold battery health data. Thereby the method 400 determining whether the battery swapping is required based on the determined result.

In step 410, a proximal battery swapping station is identified based on the compared results and a current real time location of the electric two-wheeler and shares the current real time location to a smart device associated with the battery swapping person. In one aspect of the present embodiment, the proximal battery swapping station is identified by the battery swapping subsystem 116.

In step 412, a battery swapping technician is assigned based on the determined battery swapping station, location, parking status and location of the electric two-wheeler, specific request for swapping raised by the user, and availability of battery swapping person. In one aspect of the present embodiment, the battery swapping technician is assigned by the battery swapping subsystem 116.

In step 414, the assigned battery swapping technician is authenticated to lock and unlock a battery storage bay using secure keys for swapping of a discharged battery. In one aspect of the present embodiment, the assigned battery swapping technician is authenticated by the battery swapping subsystem 116.

The method 400 also includes manage an electric two-wheeler rider profile based on the monitored one or more electric two-wheeler parameters and one or more electric two-wheeler usage parameter. The one or more electric two-wheeler usage parameters comprises average distance travelled per day, driving style, days of week when used, job profile, parameters representative of driving capability and style, parking locations and durations, availability of battery charging stations in vicinity and areas frequently travelled.

The method 400 also includes receiving the battery State of Charge (SoC) from the battery health data capturing subsystem 112. The method 400 also includes transmitting the battery State of Charge (SoC) to the battery swapping subsystem (116) over a communication network.

The method 400 also includes keeping track of usage of the battery the unique identification (ID) with respect to the electric two-wheeler and users of the electric two-wheeler. The method 400 also includes controlling torque coordination and charging control of the electric two-wheeler. The method 400 storing the determined one or more electric two-wheeler parameters and the one or more electric two-wheeler usage parameters in a database 106 to maintain historical data associated with the battery.

The present invention solves the problem of battery recharging in electric two-wheelers and removes the range anxiety by enabling battery swapping from any location with or without intervention of the rider/user. The IoT based computing system 100 automatically detects when the electric two-wheeler needs to be charged and informs the rider. The IoT based computing system 100 in the charging time determination takes into account the electric two-wheeler health parameters, and regular electric two-wheeler parameters.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (as shown in FIG. 1) (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. An internet of things (IoT) based system to manage swapping of a battery in an electric two-wheeler, the IoT based system comprising:

a hardware processor; and a memory coupled to the hardware processor, wherein the memory comprises a set of program instructions in the form of a plurality of subsystems, configured to be executed by the hardware processor, wherein the plurality of subsystems comprises:

a battery health data capturing subsystem configured to capture battery health data of the battery through one or more sensors, wherein the battery health data comprises State of Charge (SoC) parameter and State of Health (SoH) parameter of the battery;

a vehicular metrics monitoring subsystem configured to determine one or more electric two-wheeler parameters associated with the electric two-wheeler based on the captured battery health data; wherein the one or more electric two-wheeler parameters comprises braking, acceleration, speed, economy, torque and top speed;

a battery swapping subsystem configured to:

compare the captured each of the battery health data with a prestored corresponding threshold battery health data, determine whether the battery swapping is required based on the compared results;

identify a proximal battery swapping station based on the compared results and a current real time location of the electric two-wheeler and shares the current real time location to a smart device associated with the battery swapping person;

assign a battery swapping technician based on the identified battery swapping station, location, parking status and location of the electric two-wheeler, specific request for swapping raised by the user, and availability of battery swapping person; and
authenticate the assigned battery swapping technician to lock and unlock a battery storage bay using secure keys for swapping of a discharged battery.

2. The IoT based system as claimed in claim 1, further comprising a electric two-wheeler profile management subsystem configured to generate an electric two-wheeler rider profile based on the determined one or more electric two-wheeler parameters and one or more electric two-wheeler usage parameters; wherein the one or more electric two-wheeler usage parameters comprises average distance travelled per day, driving style, days of week when used, job profile, parameters representative of driving capability and style, parking locations and durations, availability of battery charging stations in vicinity and areas frequently travelled.

3. The IoT based system as claimed in claim 1, wherein the prestored corresponding threshold battery health data is dynamically customised based on real time changes in the electric two-wheeler rider's profile by an artificial intelligence base customizing technique, and wherein the threshold battery health data is updated based on the determined one or more electric two-wheeler parameters and one or more electric two-wheeler usage parameters.

4. The IoT based system as claimed in claim 1, for determining whether the battery swapping is required based on the compared result, the battery swapping subsystem is configured to:
compare the captured each of the battery health data with a prestored corresponding threshold battery health data;
determine if the captured each of the battery health data is below the corresponding threshold battery health data; and
determine whether the battery swapping is required based on the determined result.

5. The IoT based system as claimed in claim 4, wherein the battery swapping comprises swapping of the discharged battery with a charged battery.

6. The IoT based system as claimed in claim 1, further comprising a communication subsystem configured to
receive the battery State of Charge (SoC) from the battery health data capturing subsystem; and
transmit the battery State of Charge (SoC) to the battery swapping subsystem over a communication network.

7. The IoT based system as claimed in claim 1, wherein the one or more sensors comprises a temperature sensor, a voltage sensor and a current sensor.

8. The IoT based system as claimed in claim 1, wherein each battery is configured with unique identification (ID), wherein the unique identification (ID) is configured to keep track of usage of the battery with respect to the electric two-wheeler and users of the electric two-wheeler.

9. The IoT based system as claimed in claim 1, further comprising Electric two-wheeler Control Unit (VCU) configured in the electric two-wheeler and control torque coordination and charging control.

10. The IoT based system as claimed in claim 1, wherein the determined one or more electric two-wheeler parameters and the one or more electric two-wheeler usage parameters are stored in a database to maintain historical data associated with the battery.

11. A method to manage swapping of a battery in an electric two-wheeler, the method comprises:
capturing, by a processor, battery health data of the battery through one or more sensors, wherein the battery health data comprises State of Charge (SoC) parameter and State of Health (SoH) parameter of the battery;
determining, by the processor, one or more electric two-wheeler parameters associated with the electric two-wheeler based on the captured battery health data, wherein the one or more electric two-wheeler parameters comprises braking, acceleration, speed, economy, torque and top speed;
comparing, by the processor, the captured each of the battery health data with a prestored corresponding threshold battery health data;
determining, by the processor, whether battery swapping is necessary based on the compared results;
identifying, by the processor, a proximal battery swapping station based on the compared results and a current real time location of the electric two-wheeler and shares the current real time location to a smart device associated with the battery swapping person;
assigning, by the processor, a battery swapping technician based on the determined battery swapping station, location, parking status and location of the electric two-wheeler, specific request for swapping raised by the user, and availability of battery swapping person; and
authenticating, by the processor, the assigned battery swapping technician to lock and unlock a battery storage bay using secure keys for swapping of a discharged battery.

12. The method as claimed in claim 11, further comprising manage, by a processor, an electric two-wheeler rider profile based on the determined one or more electric two-wheeler parameters and one or more electric two-wheeler usage parameters; wherein the one or more electric two-wheeler usage parameters comprises average distance travelled per day, driving style, days of week when used, job profile, parameters representative of driving capability and style, parking locations and durations, availability of battery charging stations in vicinity and areas frequently travelled.

13. The method as claimed in claim 11, wherein the threshold battery health data is dynamically customised based on real time changes in the electric two-wheeler rider's profile by an artificial intelligence base customizing technique, wherein the threshold battery health data is updated based on the determined one or more electric two-wheeler parameters and one or more electric two-wheeler usage parameters.

14. The method as claimed in claim 11, wherein for determining whether the battery swapping is required based on the compared result, the method comprises:
comparing the captured each of the battery health data with a prestored corresponding threshold battery health data;
determining if the captured each of the battery health data is below the corresponding threshold battery health data; and
determining whether the battery swapping is required based on the determined result.

15. The method as claimed in claim 14, wherein the battery swapping comprises swapping of the discharged battery with a charged battery.

16. The method as claimed in claim 11, wherein the method comprises:
receiving the battery State of Charge (SoC) from the battery health data capturing subsystem; and transmitting the battery State of Charge (SoC) to the battery swapping subsystem over a communication network.

17. The method as claimed in claim 11, wherein the one or more sensors comprises a temperature sensor, a voltage sensor and a current sensor.

18. The method as claimed in claim 11, wherein each battery is configured with unique identification (ID), wherein the unique identification (ID) is configured to keep track of usage of the battery with respect to the electric two-wheeler and users of the electric two-wheeler.

19. The method as claimed in claim 11, further comprising controlling, by the processor, torque coordination and charging control of the electric two-wheeler.

20. The method as claimed in claim 11, further comprising storing, by the processor, the determined one or more electric two-wheeler parameters and the one or more electric two-wheeler usage parameters in a database to maintain historical data associated with the battery.

\* \* \* \* \*